United States Patent [19]

Wykes et al.

[11] 3,902,686

[45] Sept. 2, 1975

[54] COMBINED VERTICAL AND LATERAL IDENTICAL LOCATION OF ACCELEROMETER AND FORCE SYSTEM

[75] Inventors: John H. Wykes, Rolling Hills Estates; Alva S. Mori, Torrance; Harvey J. Hoge, Inglewood, all of Calif.

[73] Assignee: The United States of America as represented by the Secretary of the Air Force, Washington, D.C.

[22] Filed: Oct. 17, 1973

[21] Appl. No.: 407,377

[52] U.S. Cl. .............. 244/77 G; 244/3.2; 244/45 A
[51] Int. Cl. ............................................. B64c 13/18
[58] Field of Search.......... 244/3.2, 14, 45 R, 45 A, 244/77 G, 87

[56] References Cited
UNITED STATES PATENTS

| | | | |
|---|---|---|---|
| 2,693,325 | 11/1954 | Lippisch | 244/45 R |
| 2,747,816 | 5/1956 | Howard | 244/45 A |
| 2,873,074 | 2/1959 | Harris, Jr. et al. | 244/77 G X |
| 3,141,638 | 7/1964 | Fuhrmeister et al. | 244/3.2 UX |
| 3,347,498 | 10/1967 | Priestley et al. | 244/77 G |

*Primary Examiner*—Trygve M. Blix
*Assistant Examiner*—Stephen G. Kunin
*Attorney, Agent, or Firm*—Joseph E. Rusz; William Stepanishen

[57] ABSTRACT

A structural mode control system having sensing elements to operate control force application devices, such as aerodynamic control vanes. The sensing elements are located at the control force application point.

2 Claims, 6 Drawing Figures

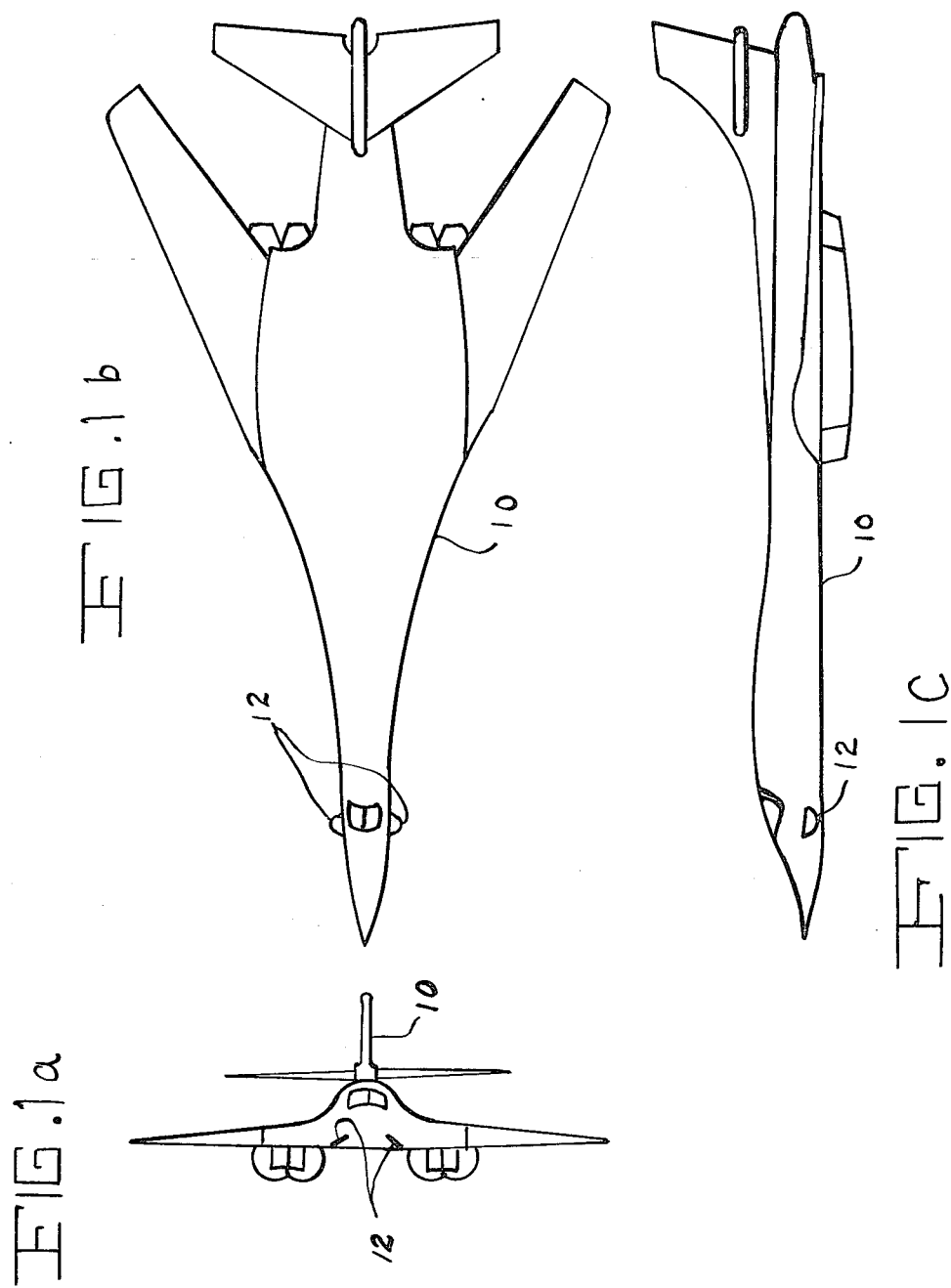

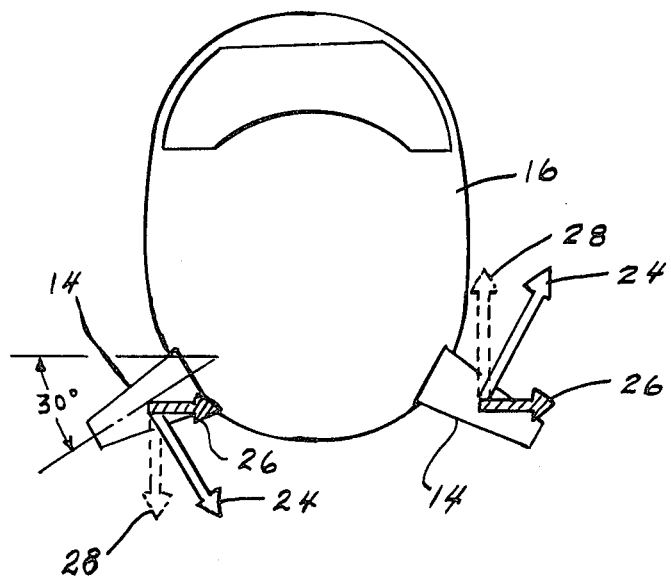
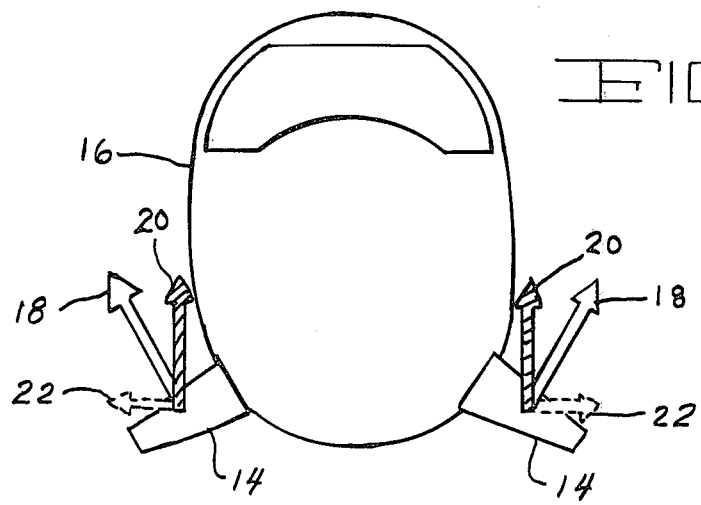

COMBINED VERTICAL AND LATERAL IDENTICAL LOCATION OF ACCELEROMETER AND FORCE SYSTEM

BACKGROUND OF THE INVENTION

The present invention relates broadly to an automatic control system for an aircraft and in particular to a structural mode control system to control the bending motions which may be applied to a flexible aircraft.

With the advent of supersonic aircraft, aircraft control has become more severe due to the extreme flexibility of the associated airframe structure. A supersonic airplane necessarily has a long, slender structure in order to reduce drag and achieve high speed. However, such a slender structure is subject to bending, or the excitation of structural modes of vibration in response to applied accelerations--whether such accelerations arise from gusts or pilot-command inputs.

In addition, because of its higher speeds, the thin, flexible, supersonic aircraft experiences greater accelerations upon encountering a gust than does a low-speed airplane, because accelerations due to gusts are proportional to flight velocity. Such fact is to be appreciated from the anology of a bump in a road (corresponding to a gust in the atmosphere) which is encountered by a fast and slow vehicle respectively, the first mentioned vehicle experiencing the greater jolt. The larger acceleration response to atmospheric turbulence (gusts), in addition to increasing pilot and passenger discomfort, may also excite the structural bending and vibration modes of the supersonic aircraft. The excitation of such modes may also induce structural fatigue in an airframe.

SUMMARY

The present invention utilizes a structural mode control system to provide bending motion control means in a flexible aircraft. The structural mode control system employs linear accelerometers as the main sensing elements and aerodynamic control surfaces, reaction jets or inertia forces as the control force application devices. A set of small aerodynamic vanes which are located on the vehicle nose and have a negative dihedral (i.e. vane tip located below vane root) are utilized to obtain both vertical and lateral control forces. The accelerometer sensors are located at the control force application point. This arrangement of sensor and control force has the capability of maintaining system stability over a wide range of aircraft weight and geometry change effects.

It is one object of the invention, therefore, to provide an improved structural mode control system to overcome the structural flexing and bending motions in a flexible aircraft due to atmospheric turbulence and other excitation mechanisms.

It is another object of the invention to provide an improved structural mode control system to improve pilot/passenger ride quality through the use of sensors which are located at the control force application force.

It is yet another object of the invention to provide an improved structural mode control system having the capability of maintaining aircraft system stability over a wide range of aircraft weight and geometry change effects.

These and other advantages, features and objects of the invention will become more apparent from the following description taken in connection with the illustrative embodiment in the accompanying drawings.

BRIEF DESCRIPTION OF THE DRAWINGS

FIGS. 1a – 1c are three views of a typical large flexible aircraft with variable geometry wing illustrating the aerodynamic vanes size, placement and angle with respect to the aircraft, FIG. 2a and 2b illustrate the structural mode control system force generation principle for the vertical control forces from symmetric deflections and for lateral control forces from differential deflections.

DESCRIPTION OF THE PREFERRED EMBODIMENT

Figure 3:
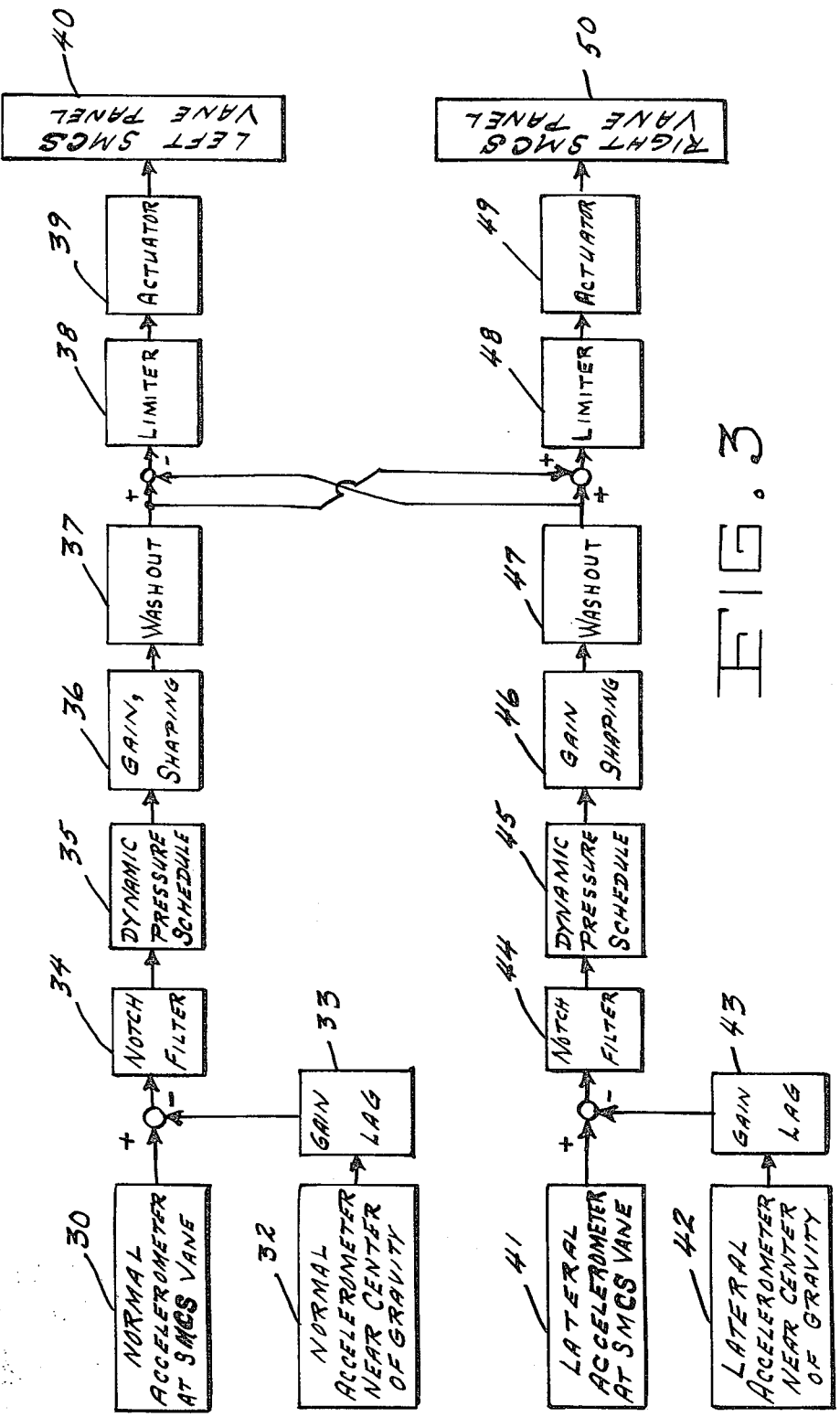
FIG. 3 is a block diagram illustrating the structural mode control system operation in accordance with the present invention.

Referring now to FIGS. 1a–1c, there is shown an aircraft 10 with a set of small aerodynamic vanes 12 having negative dihedral to obtain both vertical and lateral control forces. Three views of the aircraft 10 are shown in order to represent the relative size, shape location and angle of the control vanes 12 with respect to the aircraft 10. The structural mode control system is also referred to in this specification as the Identical Location of Accelerometer and Force system (hereinafter referred to as ILAF).

The ILAF system employs linear accelerometers as the main sensing elements and aerodynamic control surfaces, reaction jets or inertial forces as the control force application devices. In the present illustration, the small aerodynamic vanes 12 are used as control force devices. A main feature in this system is to the location of the accelerometer sensor at the control force application point. This arrangement of sensor and control force provides the desirable characteristics of maintaining system stability while being able to accommodate a wide range of vehicle weight and geometry change effects as well as flight condition effects of Mach number and altitude. Furthermore, with proper placement of additional linear accelerometers, it is possible to make the ILAF system operate satisfactorily either with the Stability and Control Augmentation System (SCAS) operating or not.

Another feature in the present system is the use of the control vanes 12 which are located on the vehicle nose to produce both vertical and lateral control forces either one at a time or both at the same time. A graphical representation of the vertical and lateral control forces is shown in FIGS. 2a, b. The vanes 14 are located on the fuselage 16 and have negative dihedral angle as shown (−30° is used in the illustration). Thus symmetrical positive deflections of the vanes 14 (FIG. 2a) cause loads to develop on the vane panels as shown by the white vectors 18. The effective working components of these vectors 18 are the dark vectors 20, while the opposing (dashed) vectors 22 cancel and produce no net force. The differential deflections of the vane panels (FIG. 2b) cause loads to develop on the vane panels as shown by the white vectors 24. The effective working components of these vectors are the dark vectors 26; while the opposing (dashed) vectors 28 cancel and produce no net force. The combined vertical and lateral loads are produced by superposing these deflection patterns as required.

There is shown in FIG. 3 the two functional parts to the system; normal acceleration signals which produce vertical control forces and lateral acceleration signals which produce lateral control forces. The vertical control force generation is described first. The normal acceleration signal produced by an accelerometer 30 at the vane has subtracted from it a signal produced by a normal accelerometer 32 located near the vehicle center of gravity. This latter signal is modified by a gain and lag shaping unit 33. The net effect of combining these two signals is to obtain a signal representative of vertical structural motion separated from whole-vehicle reponse or maneuvering motion. The net signal passes through a notch filter 34 which is tuned to eliminate the first mode natural frequency of the vane-actuator combination. The signal is then passed through a dynamic pressure gain schedule unit 35 which helps optimize the signal for a wide range of flight conditions. The gain and shaping unit 36 finally modify the original acceleration signal through effective integration to obtain the velocity signal which is required to activate the damping force from the vane. A washout network 37 is used to disengage the vertical system for malfunctions in units 30 through 36. The signal passes through electronic limiter units 38 and 48 in the circuits to the left and right vane panels respectively. These limiters 38, 48 prevent the vane actuators 39 and 49 from making hard contact with the physical actuator throw stops. The actuators 39 and 49 move the left and right vane panels 40 and 50 in unison to produce vertical aerodynamic control forces.

The lateral force generation is obtained in a similar manner. The lateral accelerometer 41 located at the vane has subtracted from it a signal produced by a lateral accelerometer 42 located near the vehicle center of gravity. This latter signal is modified by a gain and lag shaping unit 43. The net effect of combining these two signals is to obtain a signal representative of lateral structural motion separated from whole-vehicle response or maneuvering motion. The net signal passes through a notch filter 44 which is tuned to eliminate the first mode natural frequency of the vane-actuator combination. The signal is next passed through a dynamic pressure gain schedule unit 45 which helps optimize the signal for a wide range of flight conditions. The gain and shaping unit 46 finally modify the original acceleration signal through effective integration to obtain the velocity signal required to activate the damping force from the vane. The washout network 47 is used to disengage the lateral system for malfunctions in units 41 through 46. The signal passes through the right panel actuator limiter 48 without a change in sense while the signal to the left panel actuator limiter 38 is changed in sense. The resulting signals cause the actuators 49 and 39 to differentially deflect the right and left vane panels 40 and 50 to produce lateral aerodynamic control forces.

The components which comprise the present invention as shown in the block diagram of FIG. 3 are conventional items and are available as such from commercial vendors. For example, the normal and lateral accelerometers, 30,41 and 32,42 are packaged respectively as a unit and are commercially available as Model 5630–13, from Systron-Donner Corp. Concord, Calif., 94520. The individual accelerometers are also available from the same company under a separate model number. The majority of the remaining electronic items are available from Sperry Gyroscope, Division of Sperry Rand Corp. Phoenix, Arizona, under the following part numbers:

|  |  |  | Sperry Part Number |
|---|---|---|---|
| notch filter | 34,44 | — | C4–4011454–901 |
| gain lag unit | 33,43 | — | C4–4011458–901 |
| gain shaping and washout | 36,37 | — | C4–4011456–901 |
| gain shaping and washout | 46,47 | — | C4–4011456–901 |

The function of the dynamic pressure schedule is provided by the Central Air Data Computer, part number 2100148–1–1, which is manufactured by Air Research, Torrence, Calif.

The actuators 39,49 are available from Moog Inc., Monterey Park, Calif. under part number L5871200.

Although the invention has been described with reference to a particular embodiment, it will be understood to those skilled in the art that the invention is capable of a variety of alternative embodiments within the spirit and scope of the appended claims.

What is claimed is:

1. A structural mode control system for any type of flexible aircraft comprising in combination:

a set of control vanes located on the nose of said aircraft, said control vanes being geometrically arranged on opposite sides of said aircraft nose, said control vane having a negative dihedral angle, sensing means to simultaneously obtain both vertical and lateral force signals, said sensing means being located at the control force application point, said sensing means providing vertical and lateral signals in response to said vertical and lateral acceleration signals, said sensing means comprising a normal accelerometer unit to obtain said vertical force signals, said normal accelerometer unit having a first normal accelerometer located at said control vane to provide a first normal acceleration signal, and a second normal accelerometer located near the center of gravity of said aircraft to provide a second normal acceleration signal, said first and second normal acceleration signals being combined to provide said vertical signal, and a lateral accelerometer unit to obtain said lateral force signals, said lateral accelerameter unit having a first lateral accelerometer located at said control vane to provide a first lateral acceleration signal, and a second lateral accelerometer located near the center of gravity of said aircraft to provide a second lateral acceleration signal, said first and second lateral acceleration signals being combined to provide said lateral signal, and control means responsive to said vertical and lateral signals to provide simultaneous separate control signals to each of said control vanes.

2. A structural mode control system as described in claim 1 wherein said control means comprises:

first and second notch filters to receive said vertical and lateral signals respectively, said first and second notch filters being tuned to eliminate said first harmonic of said vertical and lateral signals.

first and second dynamic pressure schedule units receiving said vertical and lateral signals and optimizing said vertical and lateral signals respectively for a range of flight conditions.

first and second gain and shaping units to integrate said vertical and lateral signals to obtain vertical velocity and lateral velocity signals respectively first and second washout units to monitor said vertical velocity and lateral velocity signals respectively, said first and second washout units disengaging the vertical and lateral systems respectively for malfunctions, a first limiter unit to electronically limit said vertical velocity signal, said lateral velocity signal being changed in sign and applied to said first limiter unit, a second limiter unit to electronically limit said lateral velocity signal, said vertical velocity signal being changed in sign and being applied to said second limiter unit, a first actuator unit to receive said vertical velocity signal and to position one of said control vanes in response thereto, and a second actuator unit to receive said lateral velocity signal to position the other of said control vanes in response thereto.

* * * * *